United States Patent

[11] 3,603,885

[72] Inventors Charles A. Bartholomew;
　　　　　　　Roger L. Easton, both of Oxon Hill, Md.
[21] Appl. No. 444,519
[22] Filed Mar. 30, 1965
[45] Patented Sept. 7, 1971
[73] Assignee The United States of America as
　　　　　　　represented by the Secretary of the Navy

[54] SPECTROGRAPHIC IF PRESELECTOR
　　　8 Claims, 1 Drawing Fig.

[52] U.S. Cl. .................................................. 325/432,
　　　　　　　　　　　　　　325/342, 325/462, 325/477
[51] Int. Cl. ........................................................ H04b 1/16
[50] Field of Search............................................ 325/431,
　　　432, 462, 470, 434, 332, 342, 477; 333/76, 72;
　　　　　　　　　　　　　　　343/117, 27, 8, 17.1

[56] References Cited
UNITED STATES PATENTS

| | | | |
|---|---|---|---|
| 2,358,448 | 9/1944 | Earp.................... | 325/431 |
| 2,998,517 | 8/1961 | Beckerich.................... | 325/432 X |
| 3,054,969 | 9/1962 | Harrison...................... | 333/72 X |
| 3,088,697 | 5/1963 | Cutler.......................... | 343/117 UX |
| 3,170,120 | 2/1965 | Jensen et al. ................. | 333/72 X |

*Primary Examiner*—Rodney D. Bennett, Jr.
*Attorneys*—R. S. Sciascia and R. I. Tompkins ABSTRACT: A device for automatically tuning interferometer-type receivers in a space surveillance system comprising receiving means, a comb filter comprising a plurality of channels, each including a filter, and a tuning means connected to each filter.

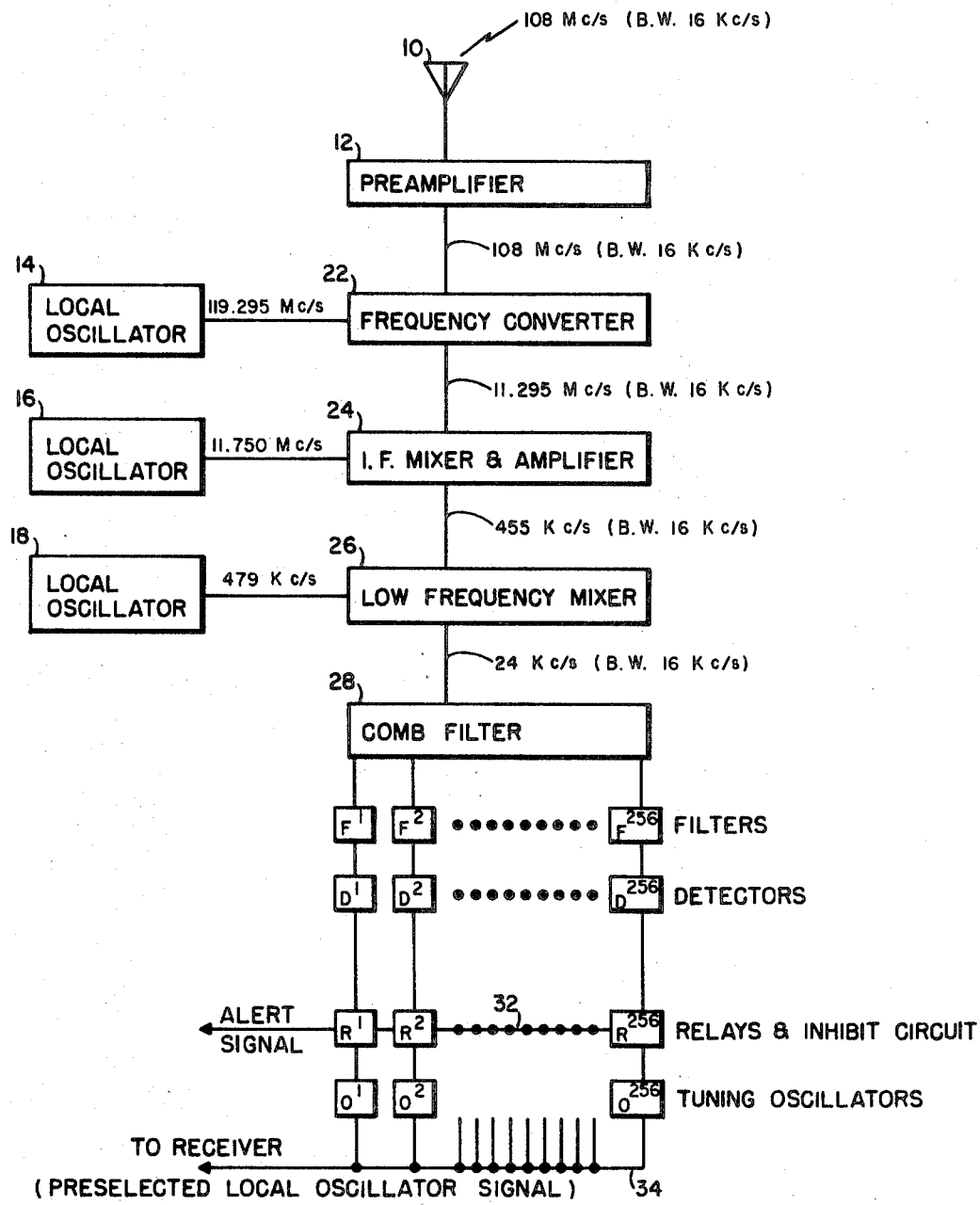

SPECTROGRAPHIC IF PRESELECTOR

The invention described herein may be manufactured and used by or for the Government of the United States of America for governmental purposes without the payment of any royalties thereon or therefor.

The present invention relates to an automatic tuning device and in particular to electrical apparatus which functions to improve the signal-to-noise ratio (S/N) of a variable-frequency signal and is particularly useful in a space surveillance system.

Recent technological advances have resulted in an ever-increasing number of manmade satellites being placed in orbit around the earth. For obvious reasons it became desirable to provide systems which would detect and monitor the orbiting satellites which pass over the continental United States. One of these systems is the Naval Space Surveillance System which consists essentially of transmitters which erect a "fence" of CW electromagnetic energy across the southern part of the United States and a receiving system that receives a portion of this electromagnetic energy which is reflected whenever a satellite passes through the "fence." The receiving system includes interferometer pairs of antennas which determine the angle of arrival of the reflected energy, and hence the satellite direction, with respect to the receiving stations local vertical. The Naval Space Surveillance System if further described in U.S. Pat. No. 3,122,741 issued to Roger L. Easton on Feb. 25, 1964 and in an article by Philip J. Klass titled "Spasur Net Giving Vital Norad Coverage" which appeared in the Nov. 26, 1962 issue of Aviation Week and Space Technology.

The present invention, while obviously of broad utility, was developed to improve the operational capabilities of the Naval Space Surveillance System. When the System transmitters are operating at their normal CW frequency of 108 mc./sec., an IF bandwidth of 16 kc./sec. is required to optimally utilize the varying frequencies of the reflected signal which occur because of the doppler effect from the various possible satellite velocities. The duration of the reflected CW signals is of the order of 1 second, i.e. the time required by the satellite to pass through the "fence." These operating circumstances obviously require that tuning of the receiving system be automated.

This invention provides a significant improvement in the performance of the receiver system of the Naval Space Surveillance System by allowing the receiver IF bandwidth to be greatly reduced, typically to a bandwidth of 200 cycles, with the attendant improvement in receiver sensitivity resulting from the improvement of the S/N ratio due to the virtual elimination of the broadband noise. To accomplish this the invention provides a comb filter connected to receive the varying frequency reflected CW energy. Each channel or tooth of the comb filter includes an amplifier detector which upon receiving a signal above a predetermined threshold actuates a relay-controlled circuit that connects an IF tuning oscillator to the interferometer portion of the receiving system. The IF tuning oscillator in each comb filter tooth operates at a frequency related to the passband frequency of the tooth filter. The invention also provides additional auxiliary apparatus which will be described later.

Although the above-described invention arose as an improvement to the interferometer-type Naval Space Surveillance System, the scope of the utility of the invention can instantly be recognized as including other types of electronic receivers, such as are present in moving target radar systems, etc. where a significant improvement in system capability can be achieved by narrow-banding and automatically tuning the receiving system.

An object of the present invention, therefore, is to improve the operating capability of electronic receiving systems.

Another object is to provide an electrical circuit which automatically tunes a receiving system.

Still another object of the invention is to improve the signal-to-noise ratio (S/N) in a receiver by narrow-banding and automatically tuning the IF portion of the receiver.

Other objects and many of the attendant advantages this invention will be readily appreciated as the same becomes better understood by reference to the following description of the invention as illustrated in the accompanying sheet of drawing which is a block diagram of the invention.

The invention is illustrated in the drawing and is herein described in the operational environment of the Naval Space Surveillance System. However, it will be apparent that the invention is of far broader utility and in its broadest aspect is useful as a device for automatically tuning a receiver to signals which occur in a given band of frequencies.

When a satellite penetrates the "fence," the antenna 10 receives a short-duration signal at a frequency which is varied within a 16 kc./sec. bandwidth (by doppler effects due to the satellite velocity) from the 108 mc./sec. transmitted "fence" frequency. After amplification by 12, this signal is successively reduced in frequency by three conventional stages of heterodyning which includes conventional components illustrated as local oscillators 14, 16 and 18 and frequency converter 22, IF mixer and amplifier 24 and low frequency mixer 26. The outputs of the three heterodyning stages are varied, to the same extent as the incoming 108 mc./sec. signal, within an 16 kc./sec. range, from the nominal frequencies of 11.295 mc./sec., 455 kc./sec. and 24 kc./sec. Because the components 12, 22, 24 and 26 must be designed to pass all signals which occur throughout the 16 kc./sec. bandwidths, these components will also pass all noise which occurs in these 16 kc./sec. bandwidths. This results in the signal-to-noise ratio (S/N) at the output of mixer 26 being undesirably low, either for direct use, such as recording, or for control purposes, such as tuning the interferometer portion of the receiver.

Comb filter 28 is connected to receive the output of low frequency mixer 26. Many filters are available commercially which are suitable for use as comb filter 28. A typical such filter includes 256 channels or teeth, the passbands of which almost span the 16 kc./sec. bandwidth centered at 24 kc./sec. Each channel or tooth of comb filter 28 includes a filter $F^1$, $F^2$ ........ $F^{256}$ which can typically be a single crystal filter having a 30-cycle bandwidth and spaced at 30-cycle intervals from adjoining filters. Each tooth of comb filter 28 further includes in series connection an amplifier, detector $D^1$, $D^2$ ........ $D^{256}$, a relay $R^1$, $R^2$ ........ $R^{256}$ and an oscillator $O^1$, $O^2$ ........ $O^{256}$. In addition to the series connections in the teeth, the filter 28 also includes an alert-and-inhibit circuit 32 which interconnects the relays and an output circuit 34 which joins the outputs of the oscillators. The circuit 32 may be any one of many obvious circuit arrangements which, upon the actuation of one of the relays $R^1$, $R^2$, ........ $R^{256}$) will energize an alert signal and also prevent actuation of any other relay. The design of circuit 32 will of course be determined on the basis of compatibility with the remainder of the receiving system. Circuit 32, for example, might take the form of a circuit which is closed upon the actuation of one of the relays, say for example $R^1$. Closing of this circuit causes the lighting of an alert lamp and the opening of electromagnetically controlled switches in the lines between detectors $D^2$ ........ $D^{256}$ and the relays $R^2$ ........ $R^{256}$.

The operation of the invention will now be described in the functional environment of the Naval Space Surveillance System, it being again emphasized that the utility of the invention is obviously of a much broader scope. When a satellite penetrates the 108 mc./sec. system "fence," energy is reflected and a short-duration signal is received by antenna 10 which varies in frequency (because of the doppler effects associated with the satellite velocity) in a bandwidth of 16 kc./sec. about the fence frequency. The incoming signal is processed through a preamplification and three frequency-lowering stages which include components 12, 14, 16, 18, 22, 24 and 26. The processed signal, at the output of mixer 26, has a frequency in a 16 kc./sec. band centered about 24 kc./sec. and is applied to the comb filter 28. Depending upon the doppler frequency variation, the processed signal is passed by one of the filters $F^1$, $F^2$ ........ $F^{256}$ to the associated detector $D^1$, $D^2$ ........$D^{256}$. If a signal above a predetermined threshold is detected, the associated relay $R^1$, $R^{22}$ ......... $R^{256}$ is actuated. This event occasions, through the circuit 32, both the transmission of an alert pulse to energize appropriate signalling apparatus (not shown) and the application of a voltage to the other relays which prevents their actuation. The actuation of one of the relays $R^1$, $R^2$ ........ $R^{256}$ also occasions the energization or switching of appropriate oscillator into the circuit 34, this preselected local oscillator signal being at the correct frequency to accurately tune the IF of the interferometer portion of the receiver. The automated, precise tuning allows the receiver IF to be extremely narrow-banded, resulting in the rejection of broadband noise and a large increase in the signal-to-noise ratio (S/N). The further sophistication of resetting circuitry, if desired, could obviously be added in a straightforward manner in accordance with conventional design practices.

It will, of course, be apparent that the utility of the above-described invention is not limited to the Naval Space Surveillance System. When considered in its broadest aspects, it will be recognized that the disclosed invention is capable of automatically tuning any receiver (or filter) in a manner which allows extreme narrow-banding and the resulting enhancement of the signal-to-noise ratio (S/N).

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. In a space surveillance system which includes interferometer-type receivers for receiving signals from satellites, said signals varying in frequency within a predetermined range because of the doppler effect arising from different possible satellite velocities, a device for automatically tuning said receivers comprising:

An antenna for receiving said varying frequency signal from said satellite;

A filter having a plurality of channels;

Means, including at least one stage of frequency reduction, for coupling said antenna to said comb filter;

A filter in each of said plurality of energized filter channels, each filter having a different passband contained in said predetermined range, the passbands of said filters being spaced throughout said predetermined range;

An oscillator coupled to each filter to be energized by signals passing through said filter, each oscillator operating when energized to produce a different frequency signal which, when applied thereto, tunes said interferometer-type receivers to receive said varying frequency signal and Inhibit circuit means connected to each one of said plurality of channels for preventing the concurrent energization of more than one oscillator.

2. An automatic tuning device comprising:

Means for receiving a signal that can vary in frequency within a predetermined range;

A comb filter connected to said means for receiving and comprising a plurality of channels, each of said channels including a filter having a different passband contained in said predetermined range, the passbands of said filters being spaced throughout said predetermined range and A tuning means connected to each filter to be energized by signals passing through said filter to tune a receiver to receive said frequency-varying signal.

3. An automatic tuning device as set forth in claim 2 wherein each of said tuning means is an oscillator which operates at a different frequency.

4. An automatic turning device as set forth in claim 3 wherein said means for receiving includes at least one stage of frequency reduction.

5. In a space surveillance system which includes interferometer-type receivers for receiving signals from satellites, said signals varying in frequency within a predetermined range because of the doppler effect arising from different possible satellite velocities, a device for automatically tuning said receivers comprising:

An antenna for receiving said varying frequency signal from said satellite;

A comb filter having a plurality of channels;

Means coupling said antenna and said comb filter;

A filter in each of said plurality of comb filter channels, each filter having a different passband contained in said predetermined range, the passbands of said filters being spaced throughout said predetermined range and A tuning means connected to each filter to be energized by signals passing through said filter to tone said interferometer-type receivers to receive said frequency-varying signal.

6. An automatic tuning device as set forth in claim 5 wherein each of said tuning means is an oscillator which operates at a different frequency.

7. An automatic tuning device as set forth in claim 5 wherein said comb filter further includes inhibit circuit means connected to every one of said tuning means for preventing the concurrent energization of more than one tuning means.

8. An automatic tuning device as set forth in claim 5 wherein said coupling means includes at least one stage of frequency reduction.